(12) United States Patent
Adiletta et al.

(10) Patent No.: US 10,788,630 B2
(45) Date of Patent: Sep. 29, 2020

(54) TECHNOLOGIES FOR BLIND MATING FOR SLED-RACK CONNECTIONS

(71) Applicant: Intel Corporation, Santa Clara, CA (US)

(72) Inventors: Matthew J. Adiletta, Bolton, MA (US); Aaron Gorius, Upton, MA (US); Myles Wilde, Charlestown, MA (US); Michael T. Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,041

(22) Filed: Dec. 30, 2016

(65) Prior Publication Data

US 2018/0024306 A1    Jan. 25, 2018

Related U.S. Application Data

(60) Provisional application No. 62/365,969, filed on Jul. 22, 2016, provisional application No. 62/376,859, (Continued)

(51) Int. Cl.
*G02B 6/38* (2006.01)
*G02B 6/42* (2006.01)
(Continued)

(52) U.S. Cl.
CPC ......... *G02B 6/3897* (2013.01); *G02B 6/3882* (2013.01); *G02B 6/3893* (2013.01); *G02B 6/4292* (2013.01); *G02B 6/4452* (2013.01); *B25J 15/0014* (2013.01); *B65G 1/0492* (2013.01); *G05D 23/1921* (2013.01); *G05D 23/2039* (2013.01); *G06F 1/183* (2013.01); (Continued)

(58) Field of Classification Search
CPC .. G02B 6/3882; G02B 6/3893; G02B 6/3897; G02B 6/4292; G02B 6/4452
See application file for complete search history.

(56) References Cited

U.S. PATENT DOCUMENTS 4,151,580 A * 4/1979 Struger ............... H05K 7/1469
361/755
4,699,455 A * 10/1987 Erbe .................... G02B 6/4202
385/88

(Continued)

OTHER PUBLICATIONS

International search report for PCT application No. PCT/US2017/038540, dated Sep. 21, 2017 (3 pages).

(Continued)

*Primary Examiner* — Daniel Petkovsek
(74) *Attorney, Agent, or Firm* — Barnes & Thornburg LLP

(57) ABSTRACT

Technologies for blind mating of optical connectors in a rack of a data center are disclosed. In the illustrative embodiment, a sled can be slid into a rack and an optical connector on the sled will blindly mate with a corresponding optical connector on the rack. The illustrative optical connector on the sled includes two guide post receivers which mate with corresponding guide posts on the optical connector on the rack such that, when mated, optical fibers of the optical connector on the rack will be aligned and optically coupled with corresponding optical fibers on the optical connector of the sled.

6 Claims, 13 Drawing Sheets

Related U.S. Application Data filed on Aug. 18, 2016, provisional application No. 62/427,268, filed on Nov. 29, 2016.

(51) Int. Cl.

| | | |
|---|---|---|
| *G02B 6/44* | (2006.01) | |
| *H04Q 11/00* | (2006.01) | |
| *G06F 1/20* | (2006.01) | |
| *H04W 4/80* | (2018.01) | |
| *G06F 1/18* | (2006.01) | |
| *G06F 3/06* | (2006.01) | |
| *G06F 8/65* | (2018.01) | |
| *G06F 9/30* | (2018.01) | |
| *G06F 9/38* | (2018.01) | |
| *G06F 9/4401* | (2018.01) | |
| *G06F 9/50* | (2006.01) | |
| *G06F 9/54* | (2006.01) | |
| *G06F 12/109* | (2016.01) | |
| *G06F 12/14* | (2006.01) | |
| *G06F 13/16* | (2006.01) | |
| *G06F 13/40* | (2006.01) | |
| *G06Q 10/08* | (2012.01) | |
| *G06Q 10/00* | (2012.01) | |
| *G06Q 50/04* | (2012.01) | |
| *G08C 17/02* | (2006.01) | |
| *G11C 7/10* | (2006.01) | |
| *G11C 11/56* | (2006.01) | |
| *H03M 7/30* | (2006.01) | |
| *H03M 7/40* | (2006.01) | |
| *H04B 10/25* | (2013.01) | |
| *H04L 12/24* | (2006.01) | |
| *H04L 12/26* | (2006.01) | |
| *H04L 12/851* | (2013.01) | |
| *H04L 12/811* | (2013.01) | |
| *H04L 12/931* | (2013.01) | |
| *H04L 29/08* | (2006.01) | |
| *H04L 29/06* | (2006.01) | |
| *H05K 5/02* | (2006.01) | |
| *H05K 7/14* | (2006.01) | |
| *H04L 12/911* | (2013.01) | |
| *B25J 15/00* | (2006.01) | |
| *B65G 1/04* | (2006.01) | |
| *H05K 7/20* | (2006.01) | |
| *H04L 12/939* | (2013.01) | |
| *H04W 4/02* | (2018.01) | |
| *H04L 12/751* | (2013.01) | |
| *G06F 13/42* | (2006.01) | |
| *H05K 1/18* | (2006.01) | |
| *G05D 23/19* | (2006.01) | |
| *G05D 23/20* | (2006.01) | |
| *H04L 12/927* | (2013.01) | |
| *H05K 1/02* | (2006.01) | |
| *H04L 12/781* | (2013.01) | |
| *H04Q 1/04* | (2006.01) | |
| *G06F 12/0893* | (2016.01) | |
| *H05K 13/04* | (2006.01) | |
| *G11C 5/06* | (2006.01) | |
| *G06F 11/14* | (2006.01) | |
| *G06F 11/34* | (2006.01) | |
| *G06F 12/0862* | (2016.01) | |
| *G06F 15/80* | (2006.01) | |
| *H04L 12/919* | (2013.01) | |
| *G06F 12/10* | (2016.01) | |
| *G06Q 10/06* | (2012.01) | |
| *G07C 5/00* | (2006.01) | |
| *H04L 12/28* | (2006.01) | |
| *H04L 29/12* | (2006.01) | |
| *H04L 9/06* | (2006.01) | |
| *H04L 9/14* | (2006.01) | |
| *H04L 9/32* | (2006.01) | |
| *H04L 12/933* | (2013.01) | |
| *H04L 12/947* | (2013.01) | |

(52) U.S. Cl.
CPC ............... *G06F 1/20* (2013.01); *G06F 3/061* (2013.01); *G06F 3/064* (2013.01); *G06F 3/067* (2013.01); *G06F 3/0611* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/3887* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 9/544* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/06* (2013.01); *G06Q 10/06314* (2013.01); *G06Q 10/087* (2013.01); *G06Q 10/20* (2013.01); *G06Q 50/04* (2013.01); *G07C 5/008* (2013.01); *G08C 17/02* (2013.01); *G08C 2200/00* (2013.01); *G11C 5/06* (2013.01); *G11C 7/1072* (2013.01); *G11C 11/56* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4081* (2013.01); *H03M 7/6005* (2013.01); *H03M 7/6023* (2013.01); *H04B 10/25* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/12* (2013.01); *H04L 41/147* (2013.01); *H04L 41/5019* (2013.01); *H04L 43/065* (2013.01); *H04L 43/0817* (2013.01);

H04L 43/0876 (2013.01); H04L 43/0894 (2013.01); H04L 43/16 (2013.01); H04L 45/02 (2013.01); H04L 45/52 (2013.01); H04L 47/24 (2013.01); H04L 47/38 (2013.01); H04L 47/765 (2013.01); H04L 47/782 (2013.01); H04L 47/805 (2013.01); H04L 47/82 (2013.01); H04L 47/823 (2013.01); H04L 49/00 (2013.01); H04L 49/15 (2013.01); H04L 49/25 (2013.01); H04L 49/357 (2013.01); H04L 49/45 (2013.01); H04L 49/555 (2013.01); H04L 67/02 (2013.01); H04L 67/10 (2013.01); H04L 67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L 67/12 (2013.01); H04L 67/16 (2013.01); H04L 67/306 (2013.01); H04L 67/34 (2013.01); H04L 69/04 (2013.01); H04L 69/329 (2013.01); H04Q 1/04 (2013.01); H04Q 11/00 (2013.01); H04Q 11/0003 (2013.01); H04Q 11/0005 (2013.01); H04Q 11/0062 (2013.01); H04Q 11/0071 (2013.01); H04Q 2011/0037 (2013.01); H04Q 2011/0041 (2013.01); H04Q 2011/0052 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/023 (2013.01); H04W 4/80 (2018.02); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1442 (2013.01); H05K 7/1447 (2013.01); H05K 7/1461 (2013.01); H05K 7/1485 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); H05K 2201/066 (2013.01); H05K 2201/10121 (2013.01); H05K 2201/10159 (2013.01); H05K 2201/10189 (2013.01); Y02D 10/14 (2018.01); Y02D 10/151 (2018.01); Y02P 90/30 (2015.11); Y04S 10/54 (2013.01); Y10S 901/01 (2013.01)

(56) References Cited

U.S. PATENT DOCUMENTS

| | | | | |
|---|---|---|---|---|
| 6,305,848 | B1* | 10/2001 | Gregory | G02B 6/4246 385/134 |
| 7,553,091 | B2* | 6/2009 | McColloch | G02B 6/3825 385/53 |
| 8,175,425 | B2* | 5/2012 | Chen | G02B 6/3508 385/134 |
| 9,726,829 | B2* | 8/2017 | Benner | G02B 6/3829 |
| 2002/0012238 | A1 | 1/2002 | Takahashi et al. | |
| 2005/0036742 | A1* | 2/2005 | Dean, Jr. | G02B 6/3865 385/71 |
| 2006/0072879 | A1* | 4/2006 | Yang | B24B 19/226 385/85 |
| 2007/0293065 | A1* | 12/2007 | Sato | H05K 9/0007 439/130 |
| 2008/0106881 | A1 | 5/2008 | Tari et al. | |
| 2009/0041412 | A1* | 2/2009 | Danley | B29D 11/0075 385/85 |
| 2010/0266245 | A1* | 10/2010 | Sabo | G02B 6/3825 385/79 |
| 2012/0301083 | A1 | 11/2012 | Carter et al. | |
| 2014/0002988 | A1 | 1/2014 | Roesner et al. | |
| 2014/0056560 | A1 | 2/2014 | McColloch | |
| 2015/0029495 | A1* | 1/2015 | Leigh | B08B 5/02 356/73.1 |
| 2017/0257970 | A1* | 9/2017 | Alleman | H05K 7/1489 |

OTHER PUBLICATIONS

Written opinion for PCT application No. PCT/US2017/038540, dated Sep. 21, 2017 (9 pages).

* cited by examiner

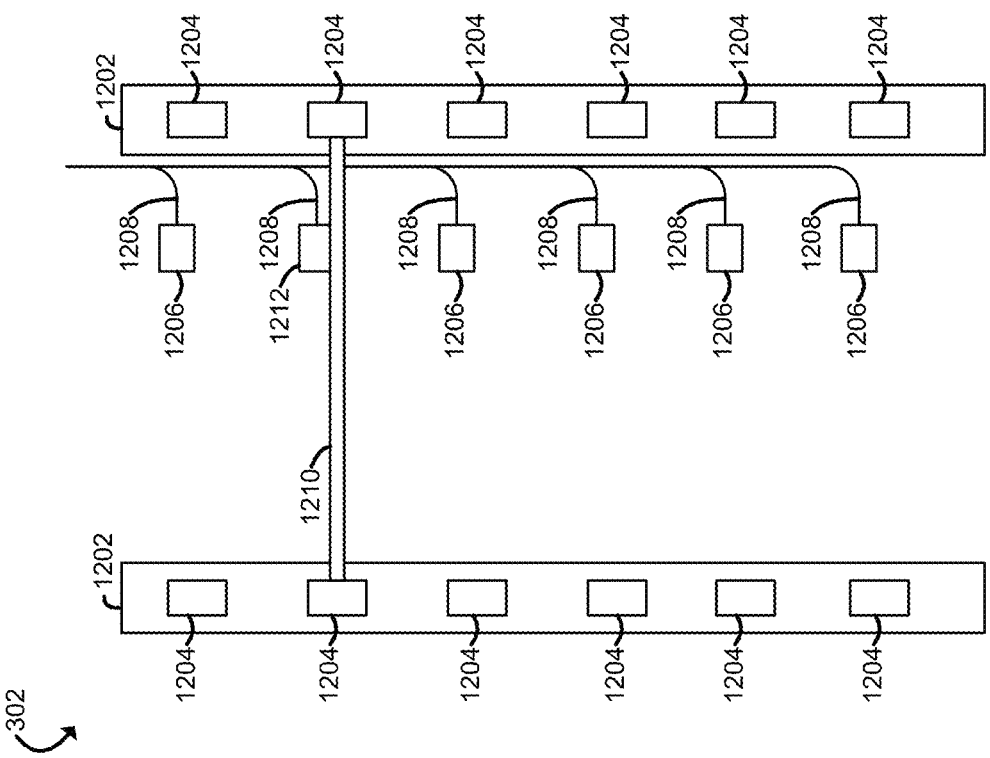
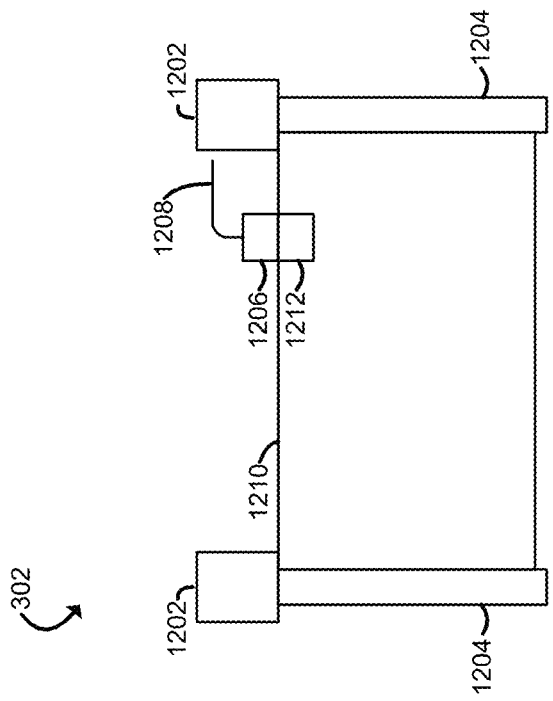
FIG. 12A
FIG. 12B

TECHNOLOGIES FOR BLIND MATING FOR SLED-RACK CONNECTIONS

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

A data center may include several racks of computing resources such as servers. The various servers in the datacenter are typically connected to each other through a series of switches. If performing a particular task requires the use of multiple servers, communication may require communicating over a network of several switches.

Communication between servers and racks in data centers is typically carried over copper cables. High-bandwidth copper cables (e.g., cables capable of carrying >10 GHz signals) typically have a high loss per unit length, limiting the length of those cables, which in turn limits the number of racks that can be directly connected to a single switch.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 12A and 12B are diagrams of an example embodiment of a sled in a rack including an optical connector assembly;

DETAILED DESCRIPTION OF THE DRAWINGS

Figure 1:
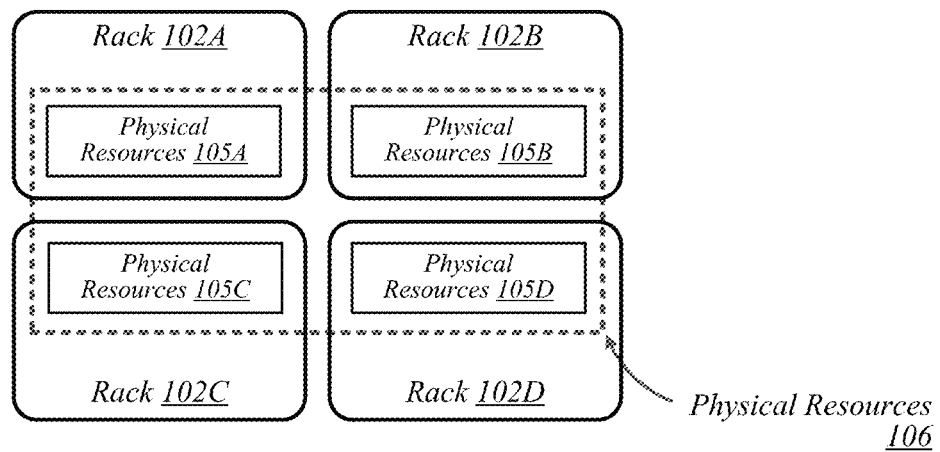
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
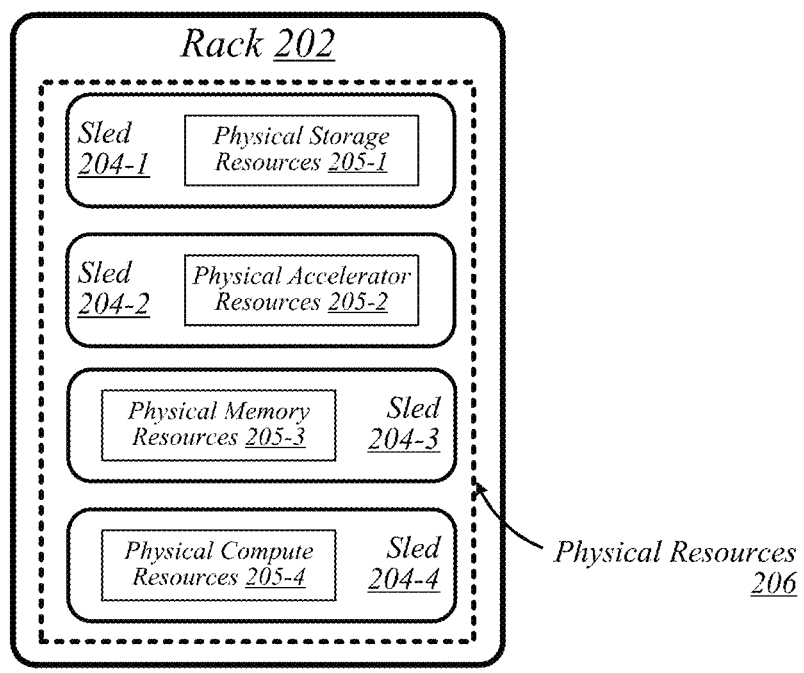
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
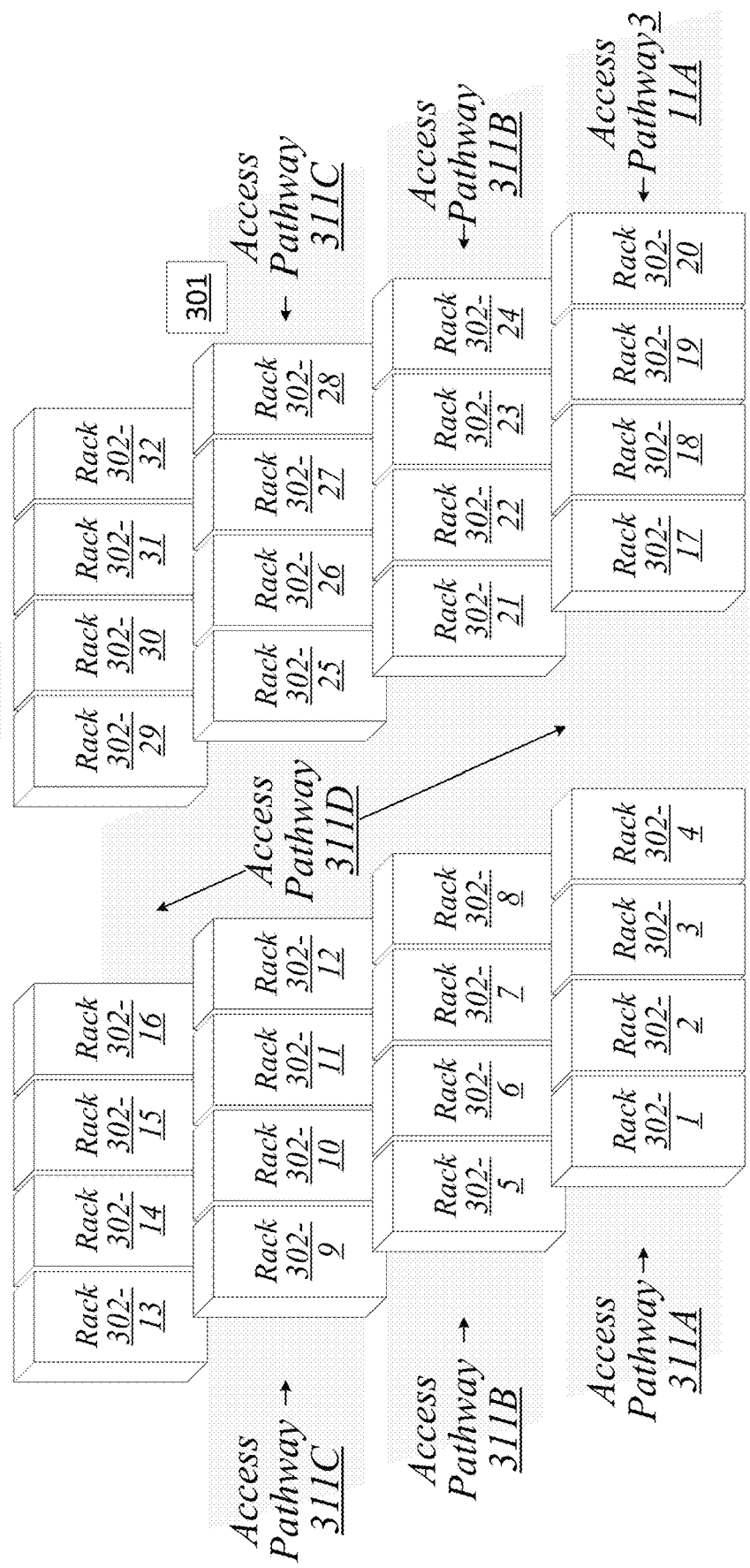
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment 301, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
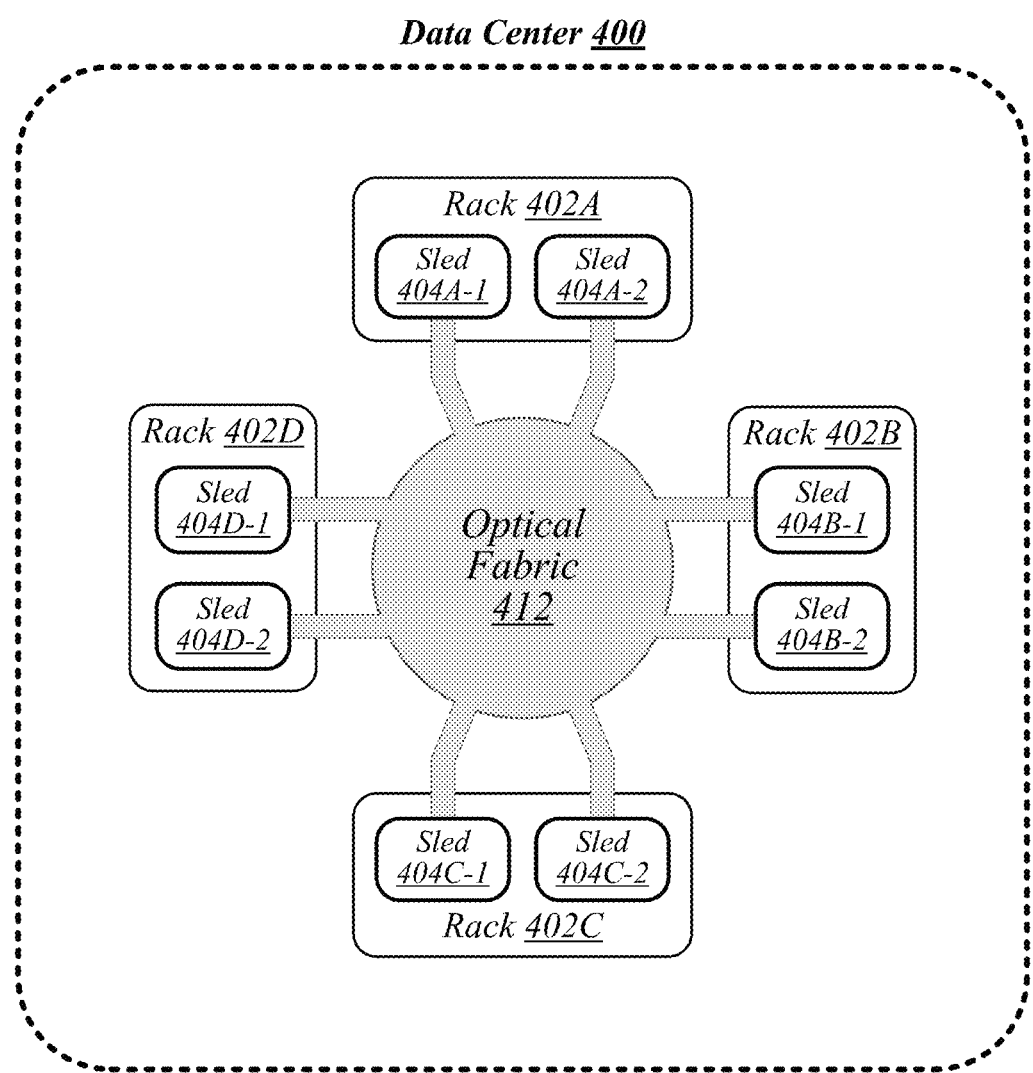
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
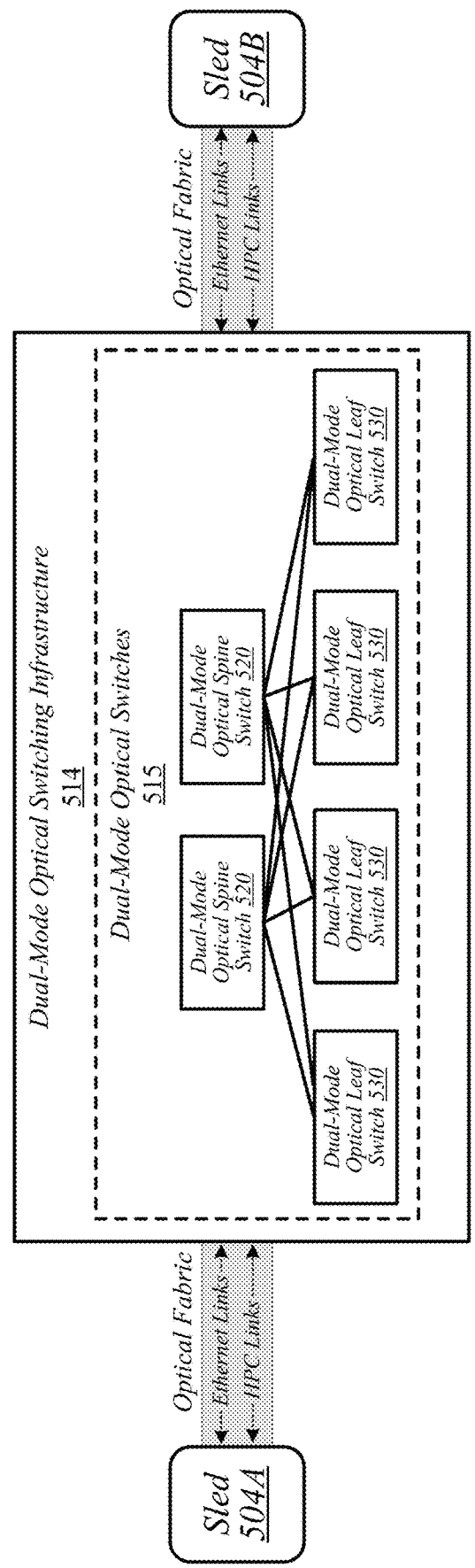
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
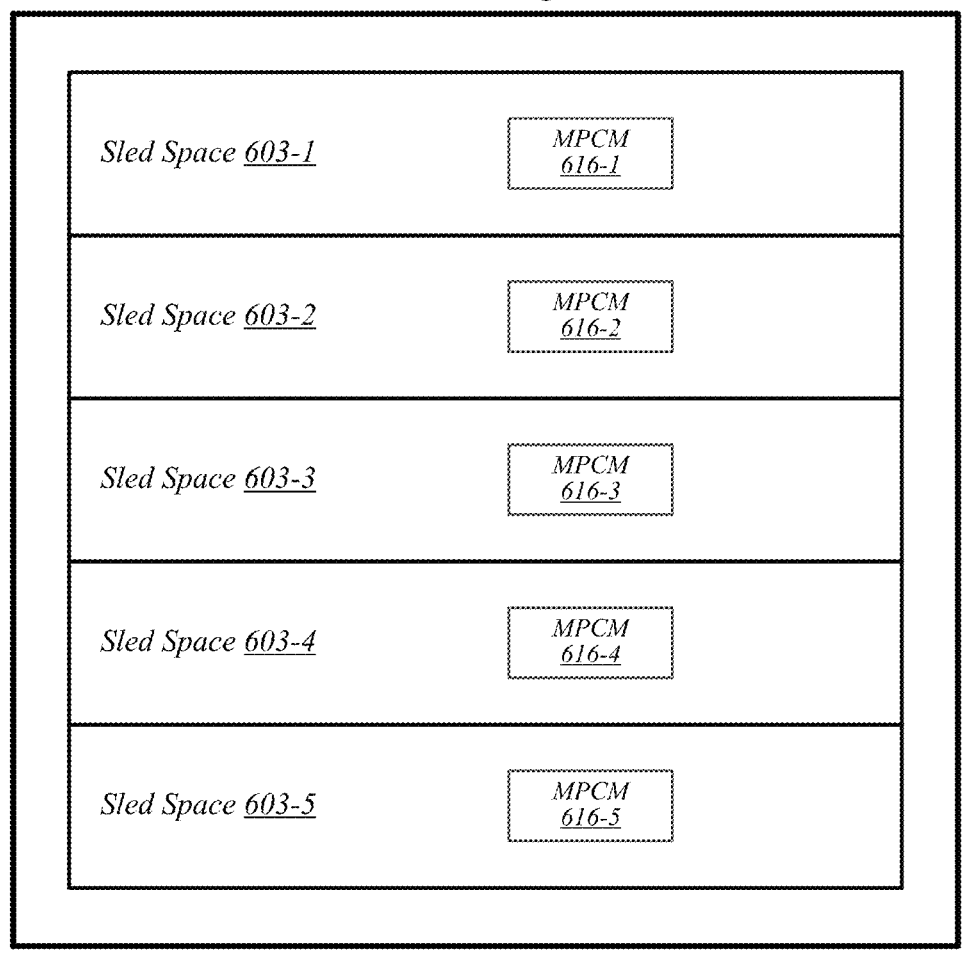
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
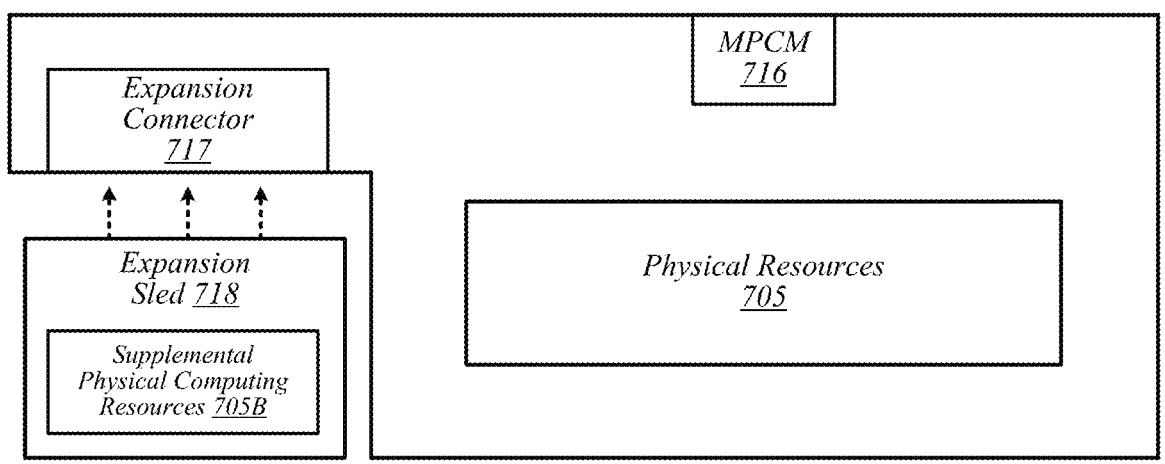
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
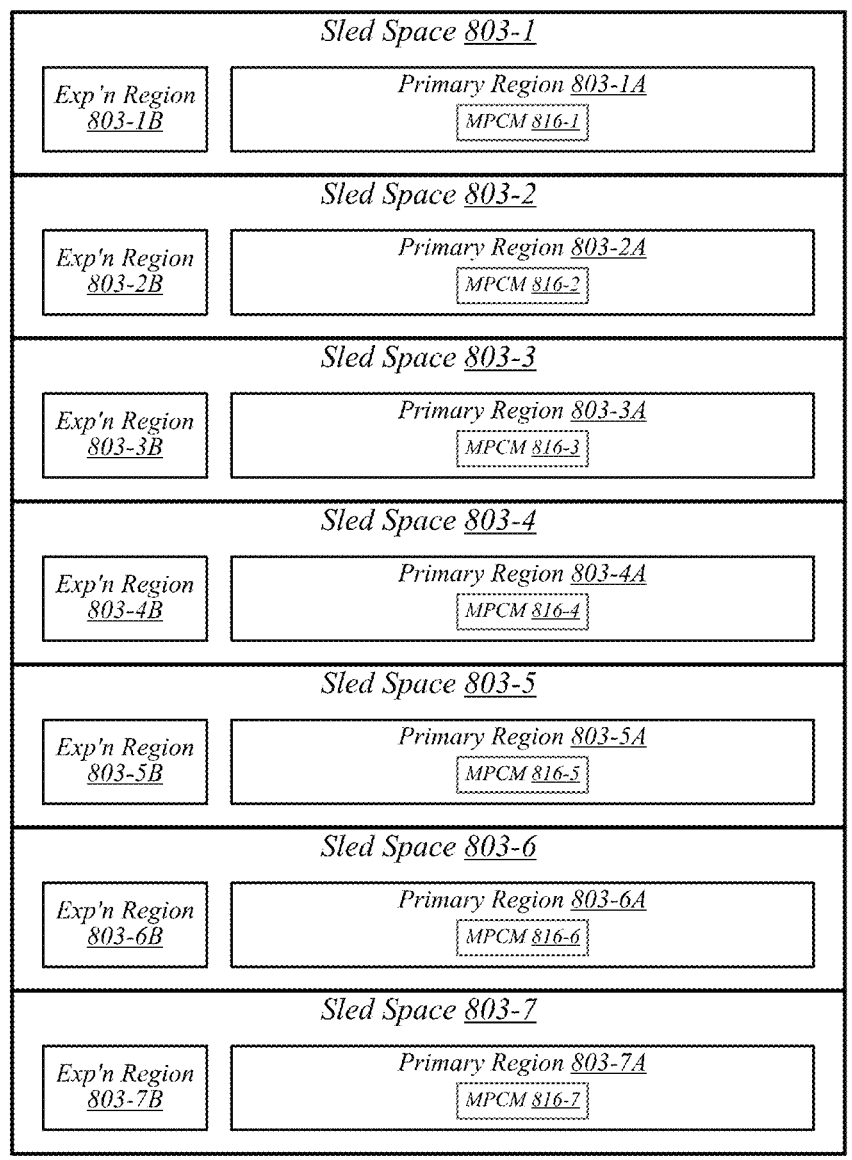
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
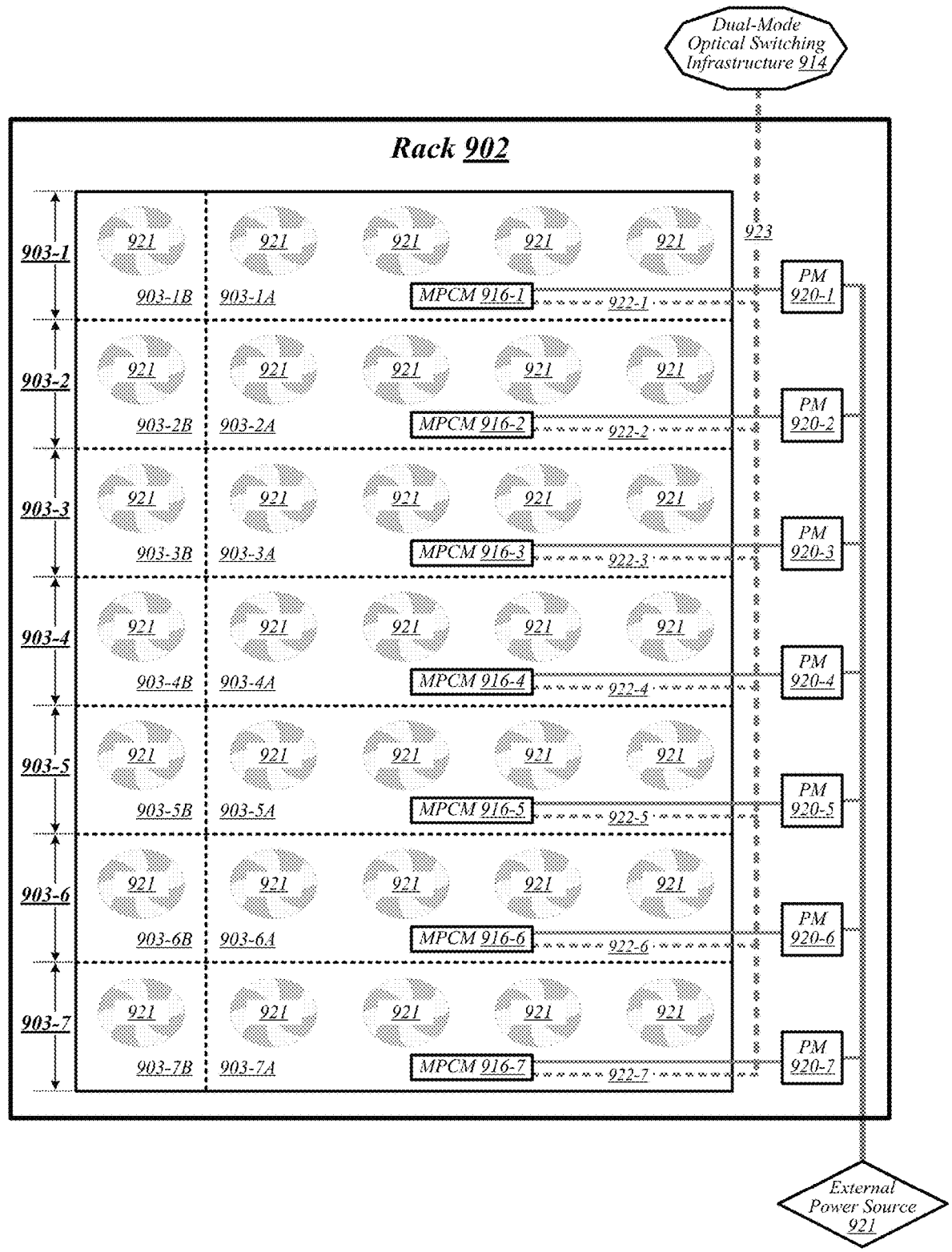
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds.

In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
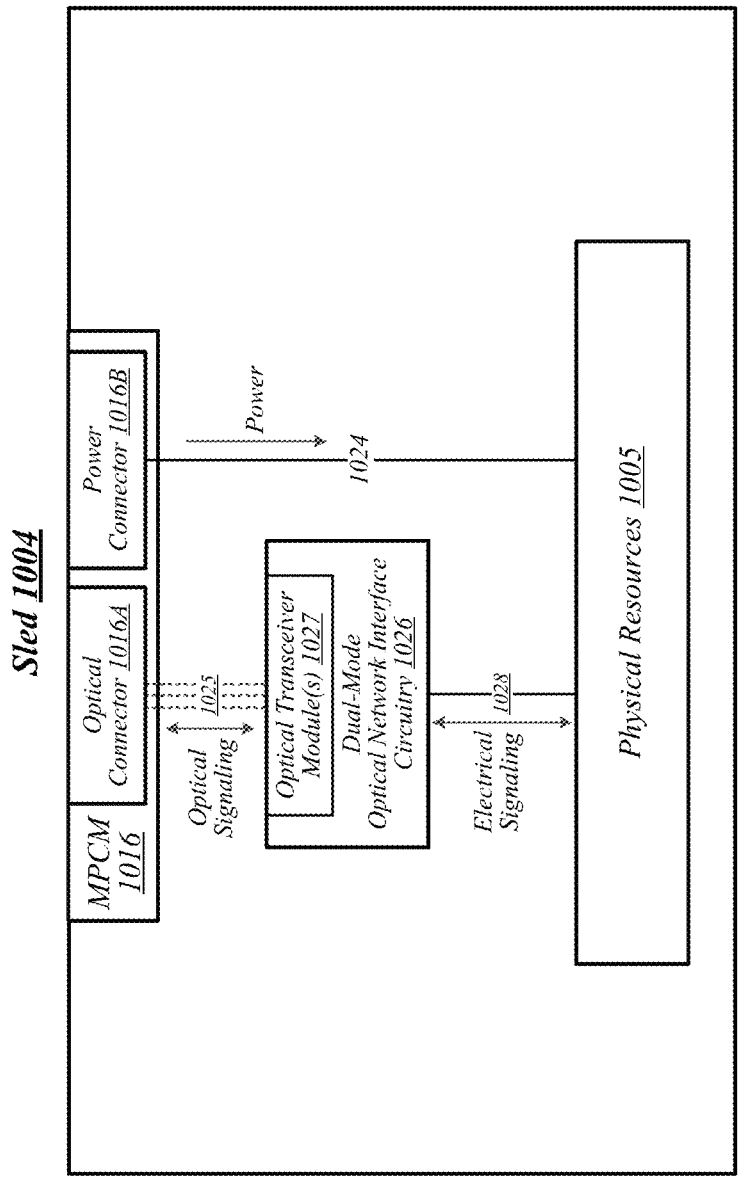
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
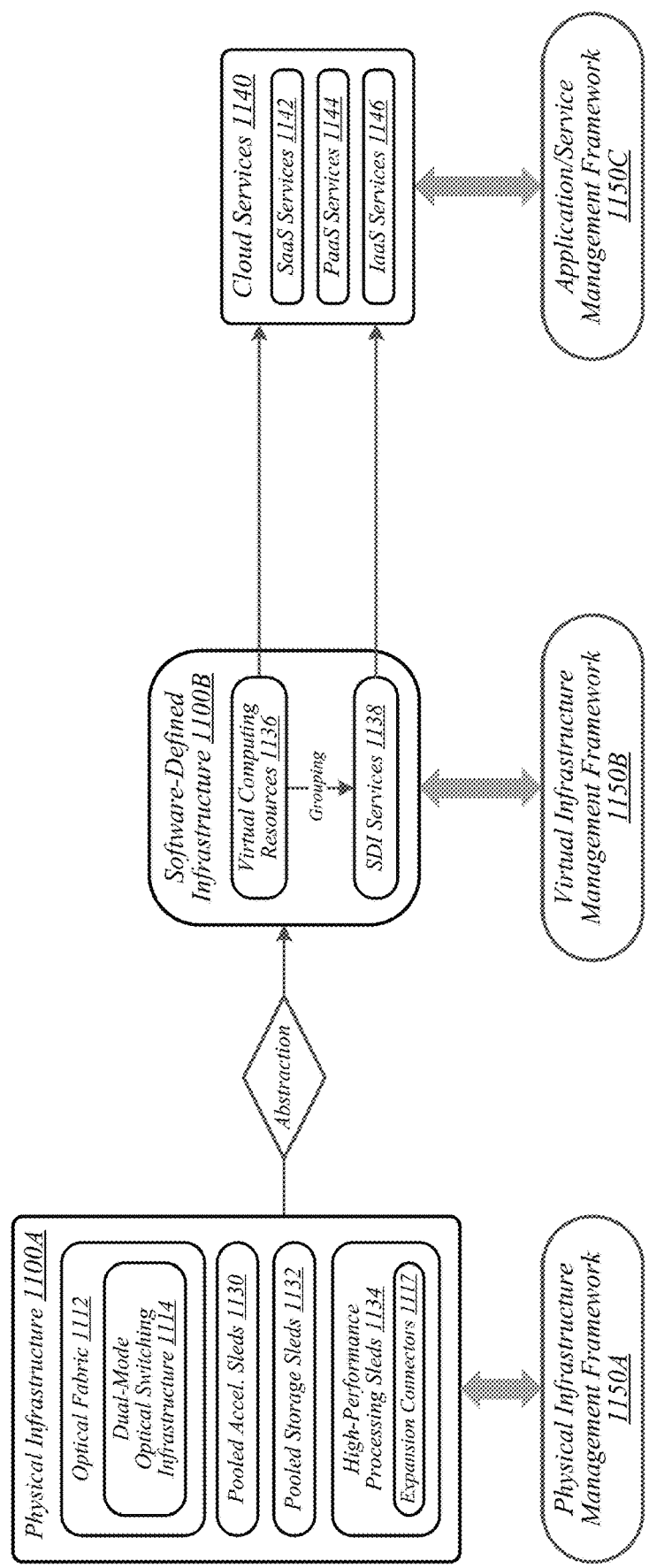
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Referring now to FIG. 12A, in some embodiments, each rack 302 of the data center 300 (see FIG. 3) includes a pair of support posts 1202 with several pairs of support arms 1204 that extend outwardly from the support posts 1202. Each pair of support posts 1202 define a sled space or slot into which a sled may be placed or otherwise received. The illustrative rack 302 includes a rack-side optical connector 1206 corresponding to each pair of support arms 1204 (i.e., associated each defined sled space/slot of the rack 302). Each rack-side optical connector 1206 includes an optical cable 1208 extending away from the corresponding optical connector 1206. The rack 302 of FIG. 12A is shown with an illustrative sled 1210 (e.g., sled 204 of FIG. 2, sled 404 of FIG. 4, sled 504 of FIG. 5, sled 704 of FIG. 7, and/or sled 1004 of FIG. 10) fully mounted, positioned, or received in a sled space or slot defined by one of the pairs of support arms 1204. The sled 1210 includes a sled-side optical connector 1212. Of course, the sled 1210 may include additional components such as compute devices, storage devices, memory, etc., as described above in regard to FIGS. 2 and 7, which are not included in FIG. 12A in the interest of clarity. It should be appreciated that a rack-side optical connector 1206 is mated with the sled-side optical connector 1212 of the sled 1210 when the sled 1210 is positioned or fully mounted with fully mounted into the corresponding sled space, but the corresponding rack-side optical connector 1206 is not shown in FIG. 12A as it is obscured by the sled-side optical connector 1212.

Referring now to FIG. 12B, a top-down plan view of the rack 302 of FIG. 12A is shown, as opposed to the front elevational view presented in FIG. 12A. In FIG. 12B, the sled-side optical connector 1212 is shown mated with the rack-side optical connector 1206 to form an optical connector assembly when the sled is fully mounted into the sled space. Although not shown in FIG. 12B, the rack-side optical connector 1206 may be secured to a support bracket attached to the support posts 1202 and extending therebetween. The rack-side optical connector 1206 is secured to the support bracket in a position to facilitate the mating with the corresponding sled-side optical connector 1206 when the sled 1210 is slid into the corresponding sled space or slot of the rack 302.

Figure 13A:
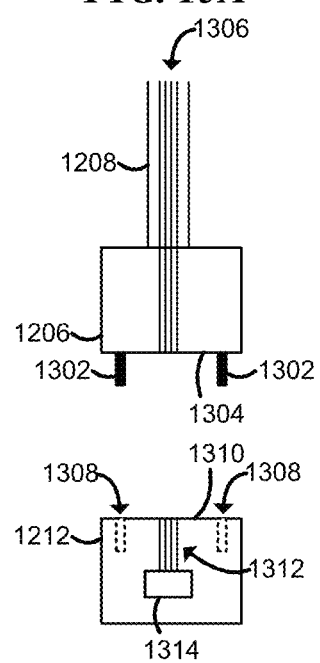
FIGS. 13A and 13B are diagrams of an example embodiment of an optical connector of the sled and rack of FIGS. 12A and 12B.
Figure 13B:
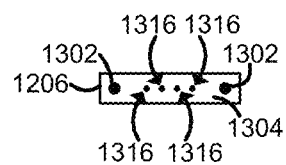

Referring now to FIG. 13A, an illustrative rack-side optical connector 1206 is shown separated from a sled-side optical connector 1212 (e.g., when the sled 1210 is in the process of being slid into a corresponding sled space or slot of the rack 302 but not yet fully positioned therein). The illustrative rack-side optical connector 1206 includes two elongated guide posts 1302 extending from a mating surface 1304 of the rack-side optical connector 1206. The optical cable 1208 includes several optical fibers 1306 which extend through the rack-side optical connector 1206 to the mating surface 1304. In some embodiments, the elongated guide posts 1302 may be tapered such that a diameter of the guide post 1302 is smaller at the distal end relative to the mating surface 1304. In the illustrative embodiment, the guide posts 1302 are at least 5 millimeters long to provide structural support and guidance during the coupling of the connectors 1206, 1212. In other embodiments, the guide posts 1302 may be 1, 2, 5, 10, 20 millimeters, or longer or shorter as needed to provide the desired support and guidance. FIG. 13A shows a top-down plan view of the rack-side optical connector 1206, while FIG. 13B shows a corresponding front elevational view. The front elevational view of the sled-side optical connector 1212 is similar to that of the rack-side optical connector 1206 shown in FIG. 13B. As shown in FIG. 13B, in the illustrative embodiment, each of the guide posts 1302 and output surfaces 1316 are collinear along the mating surface 1304.

The illustrative sled-side optical connector 1212 includes two elongated guide post receivers 1308 which are embodied as corresponding recesses shaped, sized, and/or configured to receive the elongated guide posts 1302 of the rack-side optical connector 1206 such that the mating surface 1304 of the rack-side optical connector 1206 confronts or abuts a corresponding mating surface 1310 of the sled-side optical connector 1212 when the guide posts 1302 mate with the guide post receivers 1308. The sled-side optical connector 1212 includes a plurality of optical fibers 1312 which lead from the mating surface 1310 to an optical transceiver 1314. The optical transceiver 1314 is configured to convert incoming optical signals from the rack-side connector 1206 to electrical signals and to convert electrical signals to outgoing optical signals to the rack-side connector 1206. In some embodiments, the optical transceiver 1314 may not be part of the sled-side optical connector 1212, and the optical fibers 1312 may extend through the sled-side optical connector 1212 and lead to the separate optical transceiver 1314 located elsewhere on the rack 302 and/or other location.

Each optical fiber 1306 and 1312 has a polished output surface 1316 flush with the corresponding mating surface 1304 or 1310. Of course, an output surface 1316 may be used either to receive output light from the fiber 1306 or 1312 or to provide input light into the fiber 1306 or 1312. In the embodiment shown in FIG. 13A, each of the rack-side optical connector 1206 and the sled-side optical connector 1212 includes a housing formed from a monolithic piece of the same material, such as a plastic or ceramic material. In such embodiments, each optical connector 1206 and 1212 acts as the ferrule supporting the optical fibers 1306 and 1312. In some embodiments, the rack-side optical connector 1206 and/or the sled-side optical connector 1212 may have ferrules formed from a material different from the material of the housing (e.g., the ferrules may be inserted into a body or housing of the connectors 1206, 1212). In the illustrative embodiment, each of the optical fibers 1306 and 1312 is embodied as a multi-mode fiber at near infrared wavelengths (e.g., 1300-1600 nm), such as a 50-micrometer core fiber or a 65-micrometer core fiber. Of course, in some embodiments, the optical fibers 1306 and 1312 may be single-mode fibers at near infrared wavelengths. It should be appreciated that, as used herein, the term "optical fiber" generally refers to any structure capable of guiding light at optical or near-infrared wavelengths, and includes both material drawn out into a thin strand (i.e., into a fiber) and waveguides, even if the waveguide is not in the form of a fiber. The optical fibers 1306 and 1312 may be made out of any appropriate material, such as glass, transparent plastic, or silicon. Each group of optical fibers 1306 and 1312 may include any number of fibers, such as more or less than 2, 4, 8, or 16. For example, in the illustrative embodiment, the optical fibers 1306 and 1312 each include 8 fibers.

In use, when the sled 1210 is slid or positioned into a sled space or slot defined by a pair of support arms 1204, the sled-side optical connector 1212 blindly mates with the rack-side optical connector 1206 via the guidance and support provided by the guide posts 1302 being received in the guide post receivers 1308. The rack-side optical connector 1206 and the sled-side optical connector 1212 are configured such that, when mated to each other, the optical fibers 1306 line up with the optical fibers 1312 within a small allowable deviation or tolerance, such as less than 1, 5, 10, or 20 micrometers. Additionally, the mating surface 1304 is abutted, adjoined, or otherwise pressed against the mating surface 1310 such that each optical fiber 1306 is separated from the corresponding optical fiber 1312 by a small gap, such as less than 1, 5, or 10 micrometers. It should be appreciated that, in the illustrative embodiment, the rack-side optical connector 1206 and the sled-side optical connector 1212 do not include any latches, fasteners, or other mechanical structures to hold them together, but rather the mating of the connectors 1206, 1212 is maintained by the sled 1210 maintaining its position in the rack 302. Of course, the rack 302 may include latches or fasteners to hold the sled 1210 in place within the corresponding sled place. As such, a user need only insert the sled 1210 (and possibly fasten the sled 1210 to the rack 302) in order to establish the mating of the sled-side optical connector 1212 with the rack-side optical connector 1206, and no additional configuration is required.

It should be appreciated that, in some embodiments, the guide posts 1302 may be located on the sled-side connector 1212 and the guide post receivers 1308 may be located on the rack-side connector 1206. Additionally or alternatively, as shown in FIG. 13A, the mating surfaces 1304 and 1310 may be embodied as flat surfaces. However, in other embodiments, the mating surfaces 1304 and 1310 may be curved, bent, or otherwise not flat. It should also be appreciated that, since sliding the sled 1210 into the rack 302 does not require any fine motor control (such as may be required by connecting standard optical fiber connectors), the sled 1210 may be slid into the rack 302 by a robot or via other mechanized or robotic methods. In embodiments utilizing a robot, the robot may clean each of the mating surfaces 1304 and 1310 prior to inserting the sled. The quality of the connections made between the optical fibers 1310 and 1304 may be tested (such as by the sled 1210), and, if a low-quality connection is found, the robot may remove the sled 1210 and re-clean the mating surfaces 1304 and 1310.

Examples

Illustrative examples of the devices, systems, and methods disclosed herein are provided below. An embodiment of the devices, systems, and methods may include any one or more, and any combination of, the examples described below.

Example 1 includes a sled for use in a rack in a data center, the sled comprising a circuit board configured to be supported by a pair of support arms of the rack; a sled-side optical connector configured to blindly mate with a rack-side optical connector of the rack when the sled is slid into the rack to a mounted position, wherein the sled-side connector comprises a plurality of guide posts or a plurality of guide post receivers, and wherein the sled-side connector comprises a ferrule and a plurality of optical fibers, wherein the ferrule comprises a mating surface having a hole for each optical fiber of the plurality of optical fibers, wherein each optical fiber of the plurality of optical fibers is arranged in the corresponding hole of the ferrule such that a polished output surface of the optical fiber is flush with the mating surface of the ferrule.

Example 2 includes the subject matter of Example 1, and wherein the mating surface is flat.

Example 3 includes the subject matter of any of Examples 1 and 2, and wherein the sled-side connector comprises the plurality of guide posts and wherein each guide post of the plurality of guide posts is at least 5 millimeters long.

Example 4 includes the subject matter of any of Examples 1-3, and wherein each optical fiber of the plurality of optical fibers is a 50 micrometer core fiber.

Example 5 includes the subject matter of any of Examples 1-4, and wherein each optical fiber of the plurality of optical fibers is a 65 micrometer core fiber.

Example 6 includes the subject matter of any of Examples 1-5, and wherein the sled-side optical connector does not have a fastener to secure the sled-side optical connector to the rack-side optical connector.

Example 7 includes the subject matter of any of Examples 1-6, and wherein each polished output surface of each optical fiber of the plurality of optical fibers is collinear with each other polished output surface of each other optical fiber of the plurality of optical fibers.

Example 8 includes the subject matter of any of Examples 1-7, and wherein each guide post of the plurality of guide posts or each guides post receiver of the plurality of guide post receivers is collinear with the polished output surfaces of the plurality of optical fibers.

Example 9 includes a rack of a data center, the rack comprising two elongated support posts extending upwardly from a floor of the data center; a plurality of pairs of elongated support arms, each pair of support arms defining a sled slot and comprising a first support arm extending from a first support post of the two support posts and a second support arm extending from a second support post of the two support posts; a sled comprising a circuit board supported by a pair of support arms of the plurality of pairs of support arms; an optical connector assembly comprising a first optical connector and a second optical connector, wherein one of the corresponding first and second optical connectors is a sled-side optical connector mounted on the circuit board of the sled and the other optical connector of the corresponding first and second optical connectors is a rack-side optical connector mechanically coupled to one of the two elongated support posts, wherein the first optical connector comprises a plurality of elongated guide posts, a first ferrule, and a first plurality of optical fibers, wherein the ferrule of the first optical connector comprises a mating surface with a hole for each optical fiber of the first plurality of optical fibers, wherein each optical fiber of the first plurality of optical fibers is arranged in the corresponding hole of the first ferrule such that a polished output surface of the optical fiber is flush with the mating surface of the first ferrule, wherein the second optical connector comprises a plurality of elongated guide post receivers, a second ferrule, and a second plurality of optical fibers, wherein the ferrule of the second optical connector comprises a mating surface with a hole for each optical fiber of the second plurality of optical fibers, wherein each optical fiber of the second plurality of optical fibers is arranged in the corresponding hole of the second ferrule such that a polished output surface of the optical fiber is flush with the mating surface of the second ferrule, wherein the first optical connector is mated with the second optical connector such that each guide post of the plurality of guide posts is mated with each corresponding guide post receiver of the plurality of guide post receivers and each optical fiber of the first plurality of optical fibers is optically coupled to each optical fiber of the second plurality of optical fibers.

Example 10 includes the subject matter of Example 9, and wherein each of the mating surface of the first connector and the mating surface of the second connector is flat.

Example 11 includes the subject matter of any of Examples 9 and 10, and wherein each guide post of the plurality of guide posts of first optical connector is mated with the corresponding guide post receiver of the second optical connector such that each optical fiber of the first plurality of optical fibers is laterally displaced less than 5 micrometers from the corresponding optical fiber of the second plurality of optical fibers.

Example 12 includes the subject matter of any of Examples 9-11, and wherein each guide post of the plurality of guide posts of the first optical connector of is mated with the corresponding guide post receiver of the second optical connector such that each optical fiber of the first plurality of optical fibers is laterally displaced less than 1 micrometer from the corresponding optical fiber of the second plurality of optical fibers.

Example 13 includes the subject matter of any of Examples 9-12, and wherein each guide post of the plurality of guide posts of the first optical connector is mated with the corresponding guide post receiver of the second optical connector such that each optical fiber of the first plurality of optical fibers is separated by a gap of less than 1 micrometer from the corresponding optical fiber of the second plurality of optical fibers.

Example 14 includes the subject matter of any of Examples 9-13, and wherein each guide post of the plurality of guide posts of the first optical connector is at least 5 millimeters long.

Example 15 includes the subject matter of any of Examples 9-14, and wherein each optical fiber of each of the first and second pluralities of optical fibers is a 50 micrometer core fiber.

Example 16 includes the subject matter of any of Examples 9-15, and wherein each optical fiber of each of the first and second pluralities of optical fibers is a 65 micrometer core fiber.

Example 17 includes the subject matter of any of Examples 9-16, and wherein the mating of the first and second optical connectors is maintained by an application of a force from the circuit board to the sled-side optical connector.

Example 18 includes the subject matter of any of Examples 9-17, and wherein the optical connector assembly does not have a fastener to secure the first optical connector to the second optical connector.

Example 19 includes a rack of a data center, the rack comprising two elongated support posts extending upwardly from a floor of the data center; a plurality of pairs of elongated support arms, each pair of support arms defining a sled slot and comprising a first support arm extending from a first support post of the two support posts and a second support arm extending from a second support post of the two support posts; a rack-side optical connector mechanically coupled to one of the two elongated support posts, wherein the rack-side optical connector comprises (i) a ferrule, (ii) a plurality of optical fibers, and either (iii) a plurality of elongated support posts or (iv) a plurality of elongated guide post receivers, wherein the ferrule comprises a mating surface with a hole for each optical fiber of the plurality of optical fibers, wherein each optical fiber of the plurality of optical fibers is arranged in the corresponding hole of the ferrule such that a polished output surface of the optical fiber is flush with the mating surface of the ferrule, wherein the rack-side optical connector is configured to be blindly mated with a sled-side optical connector on a sled upon insertion of the sled into one of the sled slots defined by the plurality of pairs of support arms.

Example 20 includes the subject matter of Example 19, and wherein the mating surface is flat.

Example 21 includes the subject matter of any of Examples 19 and 20, and wherein the rack-side optical connector comprises the plurality of elongated support posts.

Example 22 includes the subject matter of any of Examples 19-21, and wherein each guide post of the plurality of guide posts of the rack-side optical connector is at least 5 millimeters long.

Example 23 includes the subject matter of any of Examples 19-22, and wherein the rack-side optical connector comprises the plurality of elongated guide post receivers.

Example 24 includes the subject matter of any of Examples 19-23, and wherein each optical fiber of the plurality of optical fibers is a 50 micrometer core fiber.

Example 25 includes the subject matter of any of Examples 19-24, and wherein each optical fiber of the plurality of optical fibers is a 65 micrometer core fiber.

Example 26 includes the subject matter of any of Examples 19-25, and wherein the racks-side optical connector does not have a fastener to secure the rack-side optical connector to a sled-side optical connector upon insertion of the sled in the one of the sled slots.

Example 27 includes a method for assembling a rack of a data center, the method comprising sliding a sled comprising a circuit board into a sled slot defined by a pair of elongated support arms, wherein the pair of support arms comprise a first support arm extending from a first elongated support post and a second support arm extending from a second elongated support post, wherein sliding the sled into the sled slot comprises blindly mating a plurality of elongated guide posts of the first optical connector with a plurality of guide post receivers of the second optical connector, blindly mating a first optical connector with a second optical connector to form an optical connector assembly, wherein one of the corresponding first and second optical connectors is a sled-side optical connector mounted on the circuit board of the sled and the other of the corresponding first and second optical connectors is a rack-side optical connector mechanically coupled to the first elongated support post, wherein blindly mating the first optical connector with the second optical connector comprises abutting a mating surface of a first ferrule of the first optical connector against a mating surface of a second ferrule of the second optical connector such that each optical fiber of a first plurality of optical fibers of the first optical connector is optically coupled with a corresponding optical fiber of a second plurality of optical fibers of the second optical connector, wherein each optical fiber of the first and second pluralities of optical fibers is arranged in a hole of the corresponding ferrule such that a polished surface of the optical fiber is flush with the corresponding mating surface.

Example 28 includes the subject matter of Example 27, and wherein each of the mating surface of the first connector and the mating surface of the second connector is flat.

Example 29 includes the subject matter of any of Examples 27 and 28, and wherein pressing the mating surface of the first ferrule against the mating surface of the second ferrule comprises pressing the mating surface of the first ferrule against the mating surface of the second ferrule such that each optical fiber of the first plurality of optical fibers is laterally displaced less than 5 micrometers from the corresponding optical fiber of the second plurality of optical fibers.

Example 30 includes the subject matter of any of Examples 27-29, and wherein pressing the mating surface of the first ferrule against the mating surface of the second ferrule comprises pressing the mating surface of the first ferrule against the mating surface of the second ferrule such that each optical fiber of the first plurality of optical fibers is laterally displaced less than 1 micrometers from the corresponding optical fiber of the second plurality of optical fibers.

Example 31 includes the subject matter of any of Examples 27-30, and wherein pressing the mating surface of the first ferrule against the mating surface of the second ferrule comprises pressing the mating surface of the first ferrule against the mating surface of the second ferrule such that each optical fiber of the first plurality of optical fibers is separated by a gap of less than 1 micrometer from the corresponding optical fiber of the second plurality of optical fibers.

Example 32 includes the subject matter of any of Examples 27-31, and wherein each guide post of the plurality of guide posts of the first optical connector is at least 5 millimeters long.

Example 33 includes the subject matter of any of Examples 27-32, and wherein each optical fiber of each of the first and second pluralities of optical fibers is a 50 micrometer core fiber.

Example 34 includes the subject matter of any of Examples 27-33, and wherein each optical fiber of each of the first and second pluralities of optical fibers is a 65 micrometer core fiber.

Example 35 includes the subject matter of any of Examples 27-34, and further including maintaining the mating of the first and second optical connectors by securing the circuit board to the pair of elongated support arms.

Example 36 includes the subject matter of any of Examples 27-35, and wherein each of sliding the sled into the sled space, mating the plurality of elongated guide posts with the plurality of guide post receivers of the second optical connector, and pressing the mating surface of the first ferrule against the mating surface of the second ferrule comprises applying a force directly to the circuit board without applying a force directly to the first optical connector and without applying a force directly to the second optical connector.

Example 37 includes the subject matter of any of Examples 27-36, and wherein sliding the sled into the sled space comprises sliding the sled into the sled space by a robot.

Example 38 includes a sled for use in a rack in a data center, the sled comprising a circuit board configured to be supported by a pair of support arms of the rack; a sled-side optical connector means for blindly mating with a rack-side optical connector of the rack when the sled is slid into the rack to a mounted position.

Example 39 includes the subject matter of Example 38, and wherein the sled-side optical connector means comprises a plurality of optical fibers, wherein each optical fiber of the plurality of optical fibers is a 50 micrometer core fiber.

Example 40 includes the subject matter of any of Examples 38 and 39, and wherein the sled-side optical connector means comprises a plurality of optical fibers, wherein each optical fiber of the plurality of optical fibers is a 65 micrometer core fiber.

Example 41 includes the subject matter of any of Examples 38-40, and wherein the sled-side optical connector means does not have a fastener to secure the sled-side optical connector to the rack-side optical connector.

Example 42 includes a rack of a data center, the rack comprising two elongated support posts extending upwardly from a floor of the data center; a plurality of pairs of elongated support arms, each pair of support arms defining a sled slot and comprising a first support arm extending from a first support post of the two support posts and a second support arm extending from a second support post of the two support posts; a rack-side optical connector means for blindly mating with a sled-side optical connector of a sled when the sled is slid into the rack to a mounted position.

Example 43 includes the subject matter of Example 42, and wherein the rack-side optical connector means comprises a plurality of optical fibers, wherein each optical fiber of the plurality of optical fibers is a 50 micrometer core fiber.

Example 44 includes the subject matter of any of Examples 42 and 43, and wherein the rack-side optical connector means comprises a plurality of optical fibers, wherein each optical fiber of the plurality of optical fibers is a 65 micrometer core fiber.

Example 45 includes the subject matter of any of Examples 42-44, and wherein the rack-side optical connector does not have a fastener to secure the rack-side optical connector to a sled-side optical connector upon insertion of the sled in the one of the sled slots.

The invention claimed is:

1. A method for assembling a rack of a data center, the method comprising:
sliding a sled comprising a circuit board into a sled slot defined by a pair of elongated support arms by a robot and by applying a force directly to the circuit board without applying a force directly to a first optical connector and without applying a force directly to a second optical connector, wherein the pair of support arms comprise a first support arm extending from a first elongated support post and a second support arm extending from a second elongated support post, wherein the circuit board is configured to be supported by the first and second support arm by direct physical contact between the circuit board and the first and second support arms,
wherein sliding the sled into the sled slot comprises:
blindly mating a plurality of elongated guide posts of the first optical connector with a plurality of guide post receivers of the second optical connector by applying a force directly to the circuit board without applying a force directly to the first optical connector and without applying a force directly to the second optical connector,
blindly mating the first optical connector with the second optical connector to form an optical connector assembly, wherein one of the corresponding first and second optical connectors is a sled-side optical connector mounted on the circuit board of the sled and the other of the corresponding first and second optical connectors is a rack-side optical connector mechanically coupled to the first elongated support post,
wherein blindly mating the first optical connector with the second optical connector comprises abutting, by applying a force directly to the circuit board without applying a force directly to the first optical connector and without applying a force directly to the second optical connector, a mating surface of a first ferrule of the first optical connector against a mating surface of a second ferrule of the second optical connector such that each optical fiber of a first plurality of optical fibers of the first optical connector is optically coupled with a corresponding optical fiber of a second plurality of optical fibers of the second optical connector without using a fastener to secure the sled-side optical connector to the rack-side optical connector and without using a fastener to secure the rack-side optical connector to the sled-side optical connector, wherein each optical fiber of the first and second pluralities of optical fibers is arranged in a hole of the corresponding ferrule such that a polished surface of the optical fiber is flush with the corresponding mating surface, the method further comprising:
moving, by the robot, along an access pathway that provides access to the rack;
removing, by the robot and in response to a determination that the sled should be replaced, the sled from the rack by applying a force directly to the circuit board without applying a force directly to the first optical connector and without applying a force directly to the second optical connector;
verifying, by the robot, an authenticity of one or more components of a replacement sled by analyzing information collected from one or more radio frequency identification (RFID) tags associated with the one or more components of the replacement sled; and
sliding, by the robot, the replacement sled into the sled slot.

2. The method of claim 1, wherein abutting the mating surface of the first ferrule against the mating surface of the second ferrule comprises abutting the mating surface of the first ferrule against the mating surface of the second ferrule such that each optical fiber of the first plurality of optical fibers is laterally displaced less than 5 micrometers from the corresponding optical fiber of the second plurality of optical fibers.

3. The method of claim 1, wherein abutting the mating surface of the first ferrule against the mating surface of the second ferrule comprises abutting the mating surface of the first ferrule against the mating surface of the second ferrule such that each optical fiber of the first plurality of optical fibers is laterally displaced less than 1 micrometers from the corresponding optical fiber of the second plurality of optical fibers.

4. The method of claim 1, wherein abutting the mating surface of the first ferrule against the mating surface of the second ferrule comprises abutting the mating surface of the first ferrule against the mating surface of the second ferrule such that each optical fiber of the first plurality of optical fibers is separated by a gap of less than 1 micrometer from the corresponding optical fiber of the second plurality of optical fibers.

5. The method of claim 1, further comprising maintaining the mating of the first and second optical connectors by securing the circuit board to the pair of elongated support arms.

6. The method of claim 1, further comprising:
cleaning, by the robot, a sled-side optical connector of the replacement sled or the rack-side optical connector before sliding the replacement sled into the sled slot.

* * * * *